G. B. Hamlin,

Feed Cutter.

No. 106,482. Patented Aug. 16, 1870.

Witnesses:
E. N. Smith
A. M. Warren

Inventor:
Geo. B. Hamlin
By attorney,
J. N. McIntire

United States Patent Office.

GEORGE B. HAMLIN, OF WILLIMANTIC, CONNECTICUT.

Letters Patent No. 106,482, dated August 16, 1870.

IMPROVEMENT IN STALK AND KINDLING-WOOD CUTTER.

The Schedule referred to in these Letters Patent and making part of the same

*To all whom it may concern:*

Be it known that I, GEORGE B. HAMLIN, of Willimantic, of the county of Windham, in the State of Connecticut, have invented certain new and useful Improvements in Machines for Cutting Corn-stalks, Kindling-Wood, &c.; and I do hereby declare that the following is a full and exact description thereof, reference being had to the accompanying drawing making part of this application.

My invention relates to a new machine for cutting up corn-stalks, brush, or kindling-wood, &c.

Previous to my invention numerous machines have been devised for the purposes of which mine is designed, but, in all of them, the cutting mechanism is such that a much greater motive power is necessary to make it perform the same work than is required in my machine.

My invention has for its object to provide a method of and means for cutting the material, by the use of which great economy of power is effected, or far greater results accomplished with the same power, and to this end my invention consists in the employment, in connection with a suitable table for the support of the material, of one or more cutting-edges or knives, so arranged in a rotary holder as to effect a draw-cut on the material, as will be presently more fully explained.

To enable those skilled to make and use my invention, I will proceed to more fully explain the construction and operation of a machine embodying it.

In the accompanying drawing—

Figure 1:
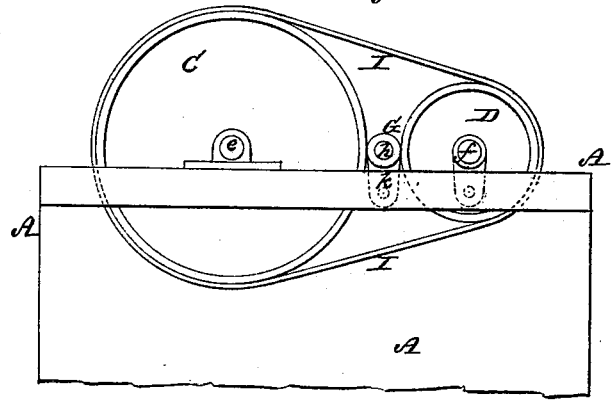

Figure 1 is a side view.

Figure 2:
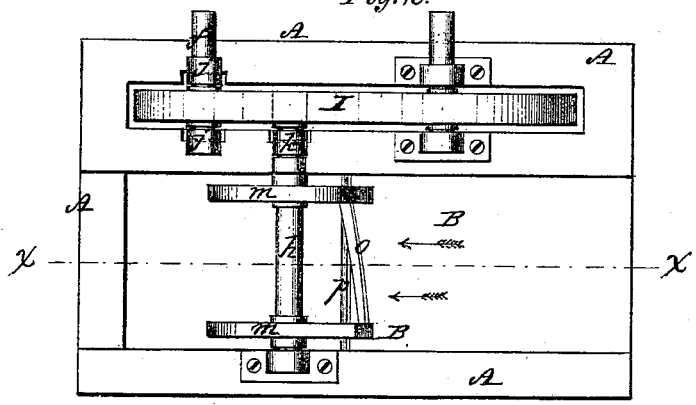

Figure 2, a top view; and

Figure 3:
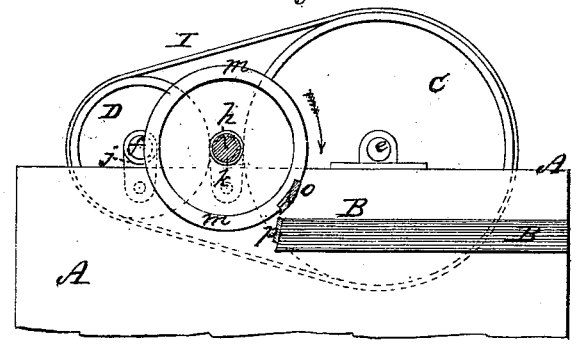

Figure 3, a vertical section, at $x\ x$, fig. 2, of a machine made according to my invention.

In the several figures the same part is designated by the same letter of reference.

A is the main frame of the machine, in which is formed a suitable table, B, and in which are mounted the working parts of the machine.

C and D are respectively the main and auxiliary driving-wheels, which are mounted on suitable shafts, $e\ f$, to either of which the motive power is applied.

Between the wheels C D is located a friction-wheel, G, which is driven by both C and D, and is fast on the shaft $h$, as clearly shown.

The wheels C D are banded together by a belt, I, and the shaft of one of them, and also shaft $h$, mounted in movable boxes, $j$ and $k$, so that the wheels D and G can move slightly toward and from wheel C, and toward and from each other, to neutralize any irregularities, and keep always in perfect gear.

The system of driving-wheels shown and alluded to need not be more minutely described here, as it forms the subject of another application by me, where it will be found fully explained.

On the shaft $h$ are two heads or circular disks, $m\ m$, which are securely fastened thereon, and in the peripheries of which is secured a knife-blade or cutter, $o$. This blade, as will be seen, is so shaped and arranged as to run diagonally to a plane passing through the axis of the disks $m$, and so that it will pass by the stationary edge $p$ with a shearing motion, (see figs. 2 and 3.)

The metallic edge or stationary cutter $p$ is arranged as seen, on the edge of table B, and merely serves for the rotary knife $o$ to work against. It will be seen that the top surface of the table B, on which the material is placed, is in a plane, or at a level, far below that in which the axis of the shaft $h$ is located, so that any point in the cutting-edge of knife $o$ moves in an arc that bisects the plane of the table at a very acute angle, instead of nearly a right angle, as in other cutting-machines.

By this arrangement of the table or support and the stationary shearing-edge $p$, far below the plane in which the axis of shaft $h$ is placed, and the diagonal arrangement of the blade $o$, any material, stalks, sticks, &c., placed on the table B, and fed to the cutters, will be cut off with a long drawing cut, after the fashion of the cut produced in cutting with a "drawing-knife" by the hand.

The general operation of the machine will be understood to be as follows:

Motive power being applied to the main shaft $e$, the wheels C D cause the wheel G and its shaft $h$ to be rapidly rotated, and the disks or heads $m\ m$, with their cutter-blade $o$, are moved in the direction indicated by the arrow, fig. 3. The stalks, or other materials to be cut, are placed on the table B, and fed in the direction indicated by the arrows, fig. 2, toward the cutting mechanism, where they are cut off, and the cut stock discharged downward and outward from the table.

Although I have shown only one knife $o$, and have found it sufficient, in a machine driven by my improved gearing system, more knives may, of course, be used, if deemed expedient, for some kinds of work.

The details of construction will depend upon the size of the machine, the velocity at which the cutting mechanism is designed to run, and the character of the work to be done, and may be varied according to the judgment of the engineer or mechanic.

The peculiar driving mechanism shown I have found admirably adapted to this kind of machine, but my invention may be embodied in a machine having any other driving mechanism, the gist of my invention resting in the idea of the drawing and shearing cut, produced by having the table, on which the stock to be cut rests, arranged below the level of the shaft of the cutter-heads, and the knife arranged diagonally on the heads $m$, or obliquely to the plane of the table.

Having fully explained the nature of my invention, so that one skilled can make and use a machine embodying it,

What I claim as new, and desire to secure by Letters Patent, is—

In combination with the friction driving-wheels C and D, and shaft $h$, the inclined rotary cutter-blade or blades $o$, stationary cutting-edge $p$, and feed-table B, the whole constructed and arranged to operate as and for the purposes set forth.

In testimony whereof I have hereunto set my hand and affixed my seal this 17th day of June, 1870.

GEORGE B. HAMLIN.

Witnesses:
S. N. BELL,
H. E. BURNHAM.